(12) United States Patent
Gerszberg et al.

(10) Patent No.: US 6,385,693 B1
(45) Date of Patent: May 7, 2002

(54) NETWORK SERVER PLATFORM/ FACILITIES MANAGEMENT PLATFORM CACHING SERVER

(75) Inventors: Irwin Gerszberg, Kendall Park; Kenny Xiaojian Huang, Somerset; Christopher K. Kwabi, Englewood; Sumit Roy, Scotch Plains; Gabriel Valdez, Jersey City, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/001,419

(22) Filed: Dec. 31, 1997

(51) Int. Cl.[7] .................................................. G06F 12/00
(52) U.S. Cl. ........................................................ 711/118
(58) Field of Search ................................. 711/118, 122, 711/148, 117; 709/212, 213, 214, 217

(56) References Cited

U.S. PATENT DOCUMENTS

| | | |
|---|---|---|
| 4,456,925 A | 6/1984 | Skerlos et al. |
| 4,620,289 A | 10/1986 | Chauvel |
| 4,725,694 A | 2/1988 | Auer et al. |
| 4,916,441 A | 4/1990 | Gombrich |
| 5,014,267 A | 5/1991 | Tompkins et al. |
| 5,157,717 A | 10/1992 | Hitchcock |
| 5,335,276 A | 8/1994 | Thompson et al. |
| 5,393,964 A | 2/1995 | Hamilton et al. |
| 5,406,615 A | 4/1995 | Miller, II et al. |
| 5,488,412 A | 1/1996 | Majeti et al. |
| 5,512,935 A | 4/1996 | Majeti et al. |
| 5,534,913 A | 7/1996 | Majeti et al. |
| 5,546,316 A | 8/1996 | Buckley et al. |
| 5,561,604 A | 10/1996 | Buckley et al. |
| 5,572,005 A | 11/1996 | Hamilton et al. |
| 5,583,965 A | 12/1996 | Douma et al. |
| 5,584,054 A | 12/1996 | Tyneski et al. |
| 5,587,735 A | 12/1996 | Ishida et al. |
| 5,619,684 A | 4/1997 | Goodwin et al. |
| 5,644,628 A | 7/1997 | Schwarzer et al. |
| 5,671,267 A | 9/1997 | August et al. |
| 5,682,195 A | 10/1997 | Hendricks et al. |
| 5,684,918 A | 11/1997 | Abecassis |
| 5,778,424 A | * 7/1998 | Guy ............................ 711/118 |
| 5,835,943 A | * 11/1998 | Yohe et al. .................. 711/118 |
| 5,860,158 A | * 1/1999 | Pai et al. ..................... 711/118 |
| 5,896,506 A | * 4/1999 | Ali et al. ..................... 709/213 |
| 5,925,100 A | * 7/1999 | Drewry et al. .............. 709/219 |
| 5,944,780 A | * 8/1999 | Chase et al. ................. 709/201 |
| 5,987,506 A | * 11/1999 | Carter et al. ................. 709/213 |

OTHER PUBLICATIONS

Doug Lowe, "Internet Explorer 3 for Windows for Dummies," 1996, pp. 43, 98–99.*
Kim Fryer, ed., "Microsoft Press Computer Dictionary," 1997, pp 72, 117, and 176.*

* cited by examiner

Primary Examiner—Matthew Kim
Assistant Examiner—C. P. Chace

(57) ABSTRACT

The location of large caches of memory located at the network server platform can reduce traffic on the network trunks or Internet backbone. In some instances these memory caches might be located at the facilities management platform. Those users supported on a specific network server platform no longer would be required to download regularly used information from the Internet backbone minimizing congestion on the network. These memory caches can be supplemented or refreshed with new data on a regular basis based on the requirements or changing requirements of the users. The close location of regularly accessed data allows for faster downloads and minimizes congestion on the communication network. In addition to user requested information, push information can be stored in these caches for fast downloading to the users.

15 Claims, 9 Drawing Sheets

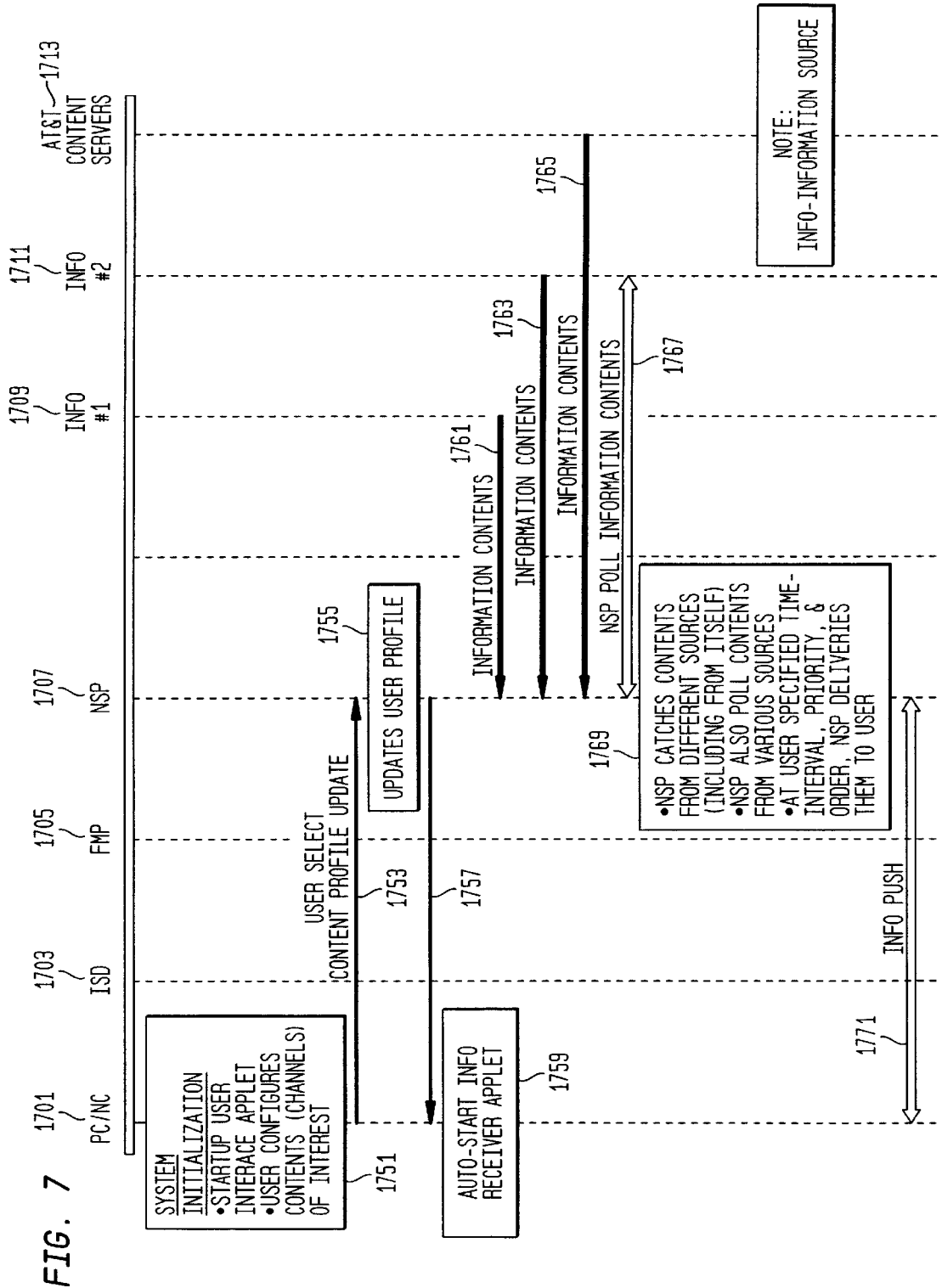

NETWORK SERVER PLATFORM/ FACILITIES MANAGEMENT PLATFORM CACHING SERVER

FIELD OF THE INVENTION

This invention discloses the location of caching servers at the network server platform and/or the facilities management platform. These caching servers act to store information and in many cases minimize network congestion by storing commonly used data closer to the user.

BACKGROUND

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the type of DSL modem provided by the local telephone company must also be provided to the end user in the customer premises equipment (CPE). Additionally, since the network is not completely controlled by the interexchange companies, it is difficult for the interexchange companies to provide data at committed delivery rates and/or desired quality levels. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

As part of this system, there is a need for improved architectures, services and equipment utilized to distinguish the interexchange companies' products and services. As traffic on the World Wide Web increases at a geometric rate, a significant portion of the Internet traffic is regularly accessed information. By moving copies of the frequently requested Web sites or frequently requested information closer to the user, the user experiences faster access times and the communication backbone's capacity is not reached ensuring that traffic is not slowed down due to congestion. If congestion persists, the Internet backbone will require unnecessary expansion.

Increasingly, companies and individuals rely upon Web access for mission-critical business functions. As a result of the overwhelming growth of Web traffic, network trunk lines are becoming congested slowing down the transmission of time critical information. Unfortunately, a significant amount of Web traffic is redundant. Multiple users at any given site request the same information or users access the same information repeatedly. Therefore, there is a need to provide more copies of the Web site closer to the user.

SUMMARY OF THE INVENTION

In order to provide an improved network, it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a video phone and/or other devices to provide new services to an end user; an intelligent services director (ISD) disposed near the customer's premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

As part of this system, one aspect of the invention provides for the location of large caches of memory located at the network server platform that can reduce traffic on the network trunks or Internet backbone. In some instances these memory caches might be located at the facilities management platform. Those users supported on a specific network server platform no longer would be required to download regularly used information from the Internet backbone minimizing congestion on the network. These memory caches can be supplemented or refreshed with new data on a regular basis based on the requirements or changing requirements of the users. These memory caches can be large terabyte size memory devices or redundant arrays of inexpensive devices.

When information is requested to be downloaded on a regular basis such as frequently visited Internet web sites, the information is downloaded during off peak times to a close location such as the network server platform. The close location of regularly accessed data allows for faster downloads and minimizes congestion on the communication network.

In addition to user requested information, push information can be stored in these caches for fast downloading to the users. This information can include telephone directory information, advertisements, movies on demand, and billing information. Periodically, the cached data is refreshed if frequently accessed or deleted if infrequently requested.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 7 illustrates a diagram of the systems and services architecture for information pushing services and information auto-delivery services.

DETAILED DESCRIPTION OF PREFERRED EMBODIMENT

Figure 1:
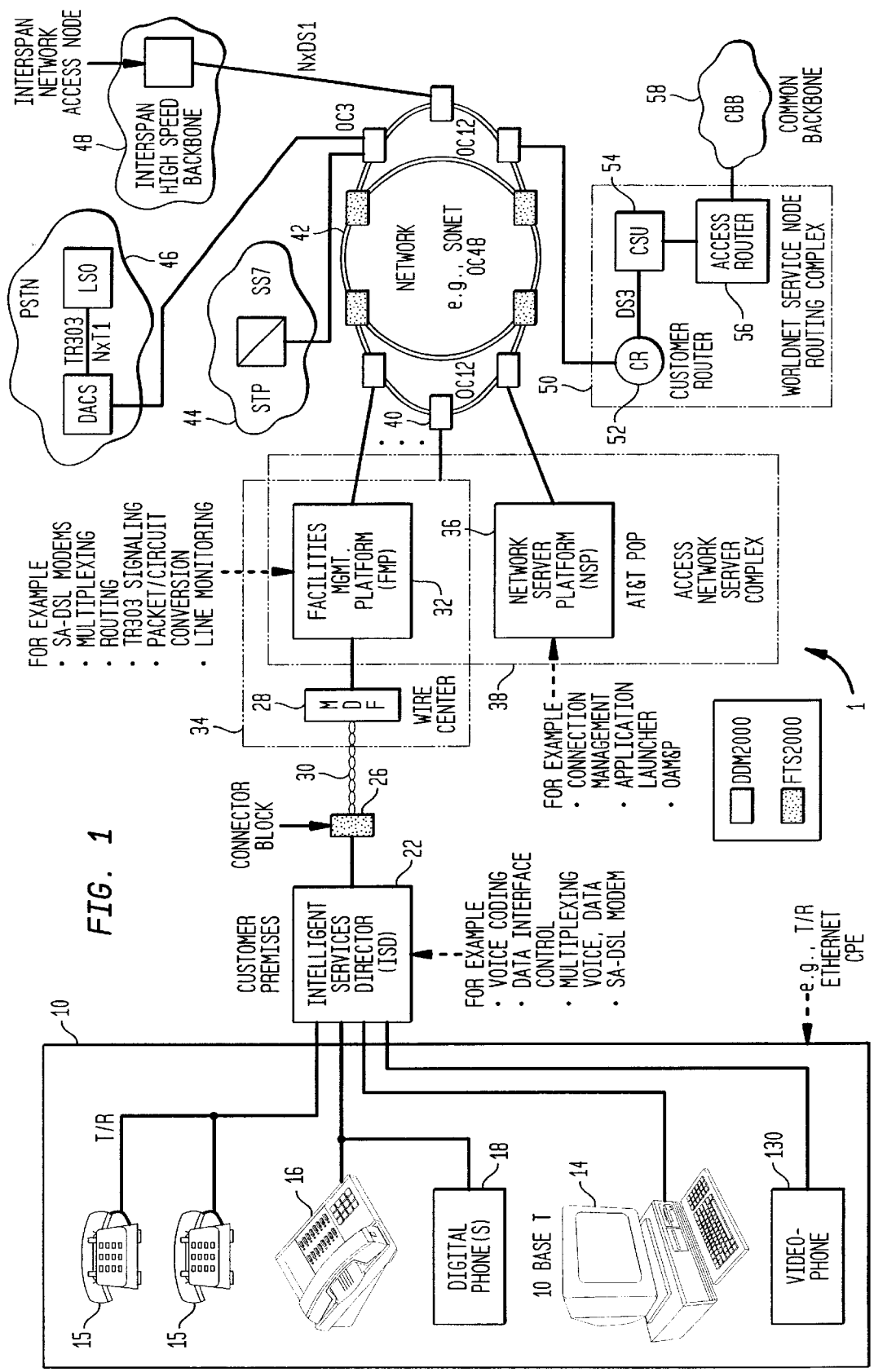
FIG. 1 illustrates an embodiment of a hybrid fiber twisted pair local loop architecture.

The following applications, filed concurrently herewith, are hereby incorporated by reference:
1. A Hybrid Fiber Twisted-pair Local Loop Network Service Architecture (Ser. No. 09/001,360);
2. Dynamic Bandwidth Allocation for use in the Hybrid Fiber Twisted-pair Local Loop Network Service Architecture (Ser. No. 09/001,425);
3. The VideoPhone (Ser. No. 09/001,905);
4. VideoPhone Privacy Activator (Ser. No. 09/001,909);
5. VideoPhone Form Factor (Ser. No. 09/001,583);
6. VideoPhone Centrally Controlled User Interface With User Selectable Options (Ser. No. 09/001,576);
7. VideoPhone User Interface Having Multiple Menu Hierarchies (Ser. No. 09/001,908);
8. VideoPhone Blocker (Ser. No. 09/001,353);
9. VideoPhone Inter-com For Extension Phones (Ser. No. 09/001,358);
10. Advertising Screen Saver (Ser. No. 09/001,574);
11. Information Display for Visual Communication Device (Ser. No. 09/001,906);
12. VideoPhone Multimedia Announcement Answering Machine (Ser. No. 09/001,911);
13. VideoPhone Multimedia Announcement Message Toolkit (Ser. No. 09/001,345);
14. VideoPhone Multimedia Video Message Reception (Ser. No. 09/001,362);
15. VideoPhone Multimedia Interactive Corporate Menu Answering Machine Announcement (Ser. No. 09/001,575);
16. VideoPhone Multimedia Interactive On-Hold Information Menus (Ser. No. 09/001,356);
17. VideoPhone Advertisement When Calling Video Non-enabled VideoPhone Users (Ser. No. 09/001,361);
18. Motion Detection Advertising (Ser. No. 09/001,355);
19. Interactive Commercials (Ser. No. 09/001,578);
20. VideoPhone Electronic Catalogue Service (Ser. No. 09/001,421);
21. A Multifunction Interface Facility Connecting Wideband Multiple Access Subscriber Loop With Various Networks (Ser. No. 09/001,356);
22.
23. Life Line Support for Multiple Service Access on Single Twisted-pair (Ser. No. 09/001,343);
24. A Network Server Platform (NSP) For a Hybrid Fiber Twisted-pair (HFTP) Local Loop Network Service Architecture (Ser. No. 09/001,582);
25. A Communication Server Apparatus For Interactive Commercial Service (Ser. No. 09/001,344);
26. NSP Multicast, PPV Server (Ser. No. 09/001,580);
27. NSP Internet, JAVA Server and VideoPhone Application Server (Ser. No. 09/001,354);
28. NSP WAN Interconnectivity Services for Corporate Telecommuting (Ser. No. 09/001,540);
29. NSP Telephone Directory White-Yellow Page Services (Ser. No. 09/001,426);
30. NSP Integrated Billing System For NSP services and Telephone services (Ser. No. 09/001,359);
31. Network Server Platform/Facility Management Platform Caching Service (Ser. No. 09/001,419);
32. An Integrated Services Director (ISD) Overall Architecture (Ser. No. 09/001,417);
33. ISD VideoPhone (Customer Premise) Local House Network (Ser. No. 09/001,418);
34. ISD Wireless Network (Ser. No. 09/001,363);
35. ISD Controlled Set-Top Box (Ser. No. 09/001,424);
36. Integrated Remote Control and Phone (Ser. No. 09/001,423);
37. Integrated Remote Control and Phone User Interface (Ser. No. 09/001,420);
38. Integrated Remote Control and Phone Form Factor (Ser. No. 09/001,910);
39. VideoPhone Mail Machine (Ser. No. 60/070,104);
40. Restaurant Ordering Via VideoPhone (Ser. No. 60/070,121);
41. Ticket Ordering Via VideoPhone (Ser. No. 60/070,103);
42. Multi-Channel Parallel/Serial Concatenated Convolutional Codes And Trellis Coded Modulation Encode/Decoder (Ser. No. 09/001,342);
43. Spread Spectrum Bit Allocation Algorithm (Ser. No. 09/001,842);
44. Digital Channelizer With Arbitrary Output Frequency (Ser. No. 09/001,581);
45. Method And Apparatus For Allocating Data Via Discrete Multiple Tones (Ser. No. 08/997,167);
46. Method And Apparatus For Reducing Near-End Cross Talk In Discrete Multi-Tone Modulators/Demodulators (Ser. No. 08/997,176).

The present application is #31 on this list.

In addition, the following two patent applications are hereby incorporated by reference:
1. U.S. patent application Ser. No. 08/943,312 filed Oct. 14, 1997 entitled Wideband Communication System for the Home, to Robert R. Miller, II and Jesse E. Russell, and
2. U.S. patent application Ser. No. 08/858,170, filed May 14, 1997, entitled Wide Band Transmission Through Wire, to Robert R. Miller, II, Jesse E. Russell and Richard R. Shively.

Referring to FIG. 1, a first exemplary communication network architecture employing a hybrid fiber, twisted-pair (HFTP) local loop 1 architecture is shown. An intelligent services director (ISD) 22 may be coupled to a central office 34 via a twisted-pair wire, hybrid fiber interconnection, wireless and/or other customer connection 30, a connector block 26, and/or a main distribution frame (MDF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g., call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks.

The NSP 36 may provide a massive cache storage for various information that may be provided across the SONET net 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services.

The ISD 22 may be interconnected to various devices such as a videophone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure widespread availability of the new features made possible by the present architecture, the customer premise equipment may be provided to end users at either a subsidized cost or given away for free, with the cost of the equipment being amortized over the services sold to the user through the equipment.

Figure 2:
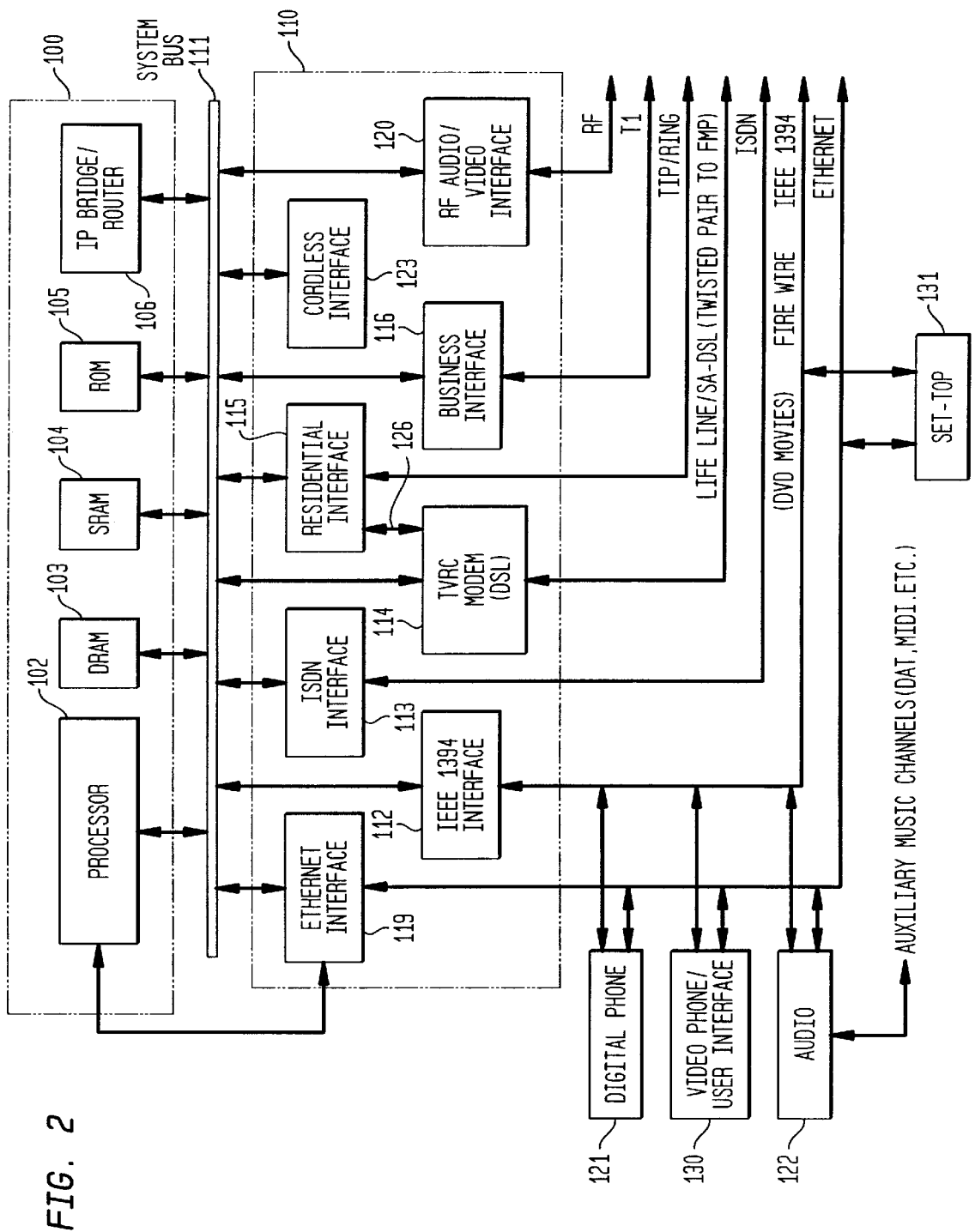
FIG. 2 is a block diagram of an embodiment of an intelligent services director consistent with the architecture shown in FIG. 1.

Referring to FIG. 2, the ISD 22 may connect with a variety of devices including analog and digital voice telephones 15, 18; digital videophones 130, devices for monitoring home security (not shown), meter reading devices (not shown), utilities devices/energy management facilities (not shown), facsimile devices 16, personal computers 14, and/or other digital or analog devices. Some or all of these devices may be connected with the ISD 22 via any suitable mechanism such as a single and/or multiple twisted-pair wires and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem.

As shown in FIG. 2, in some embodiments the ISD 22 may include a controller 100 which may have any of a variety of elements such as a central processing unit 102, a DRAM 103, an SRAM 104, a ROM 105 and/or an Internet protocol (IP) bridge router 106 connecting the controller 100 to a system bus 111. The system bus 111 may be connected with a variety of network interface devices 110. The network interface devices 110 may be variously configured to include an integrated services digital network (ISDN) interface 113, an Ethernet interface 119 (e.g., for 28.8 kbps data, 56 kbps data, ISDN, 10 BaseT, ect. an IEEE 1394 "fire wire" interface 112 (e.g., for a digital videodisc device (DVD)), a TVRC modem interface 114 (e.g., for a digital subscriber line (DSL) modem), a residential interface 114, (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900-MHZ transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone/user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the ISD 22 to the local telecommunications company's central office 34 and, in particular, to the FMP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a set top device 131.

In further embodiments, the ISD 22 may be configured as an IP proxy server such that each of the devices connected to the server utilizes transmission control protocol/Internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the video telephone 130, the digital telephone 18, and/or some other end user device.

In still further embodiments, the ISD 22 may be compatible with multicast broadcast services where multicast information is broadcast by a central location and/or other server on one of the networks connected to the FtP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/movie in real time for immediate viewing and/or into storage for later viewing.

Figure 3A:
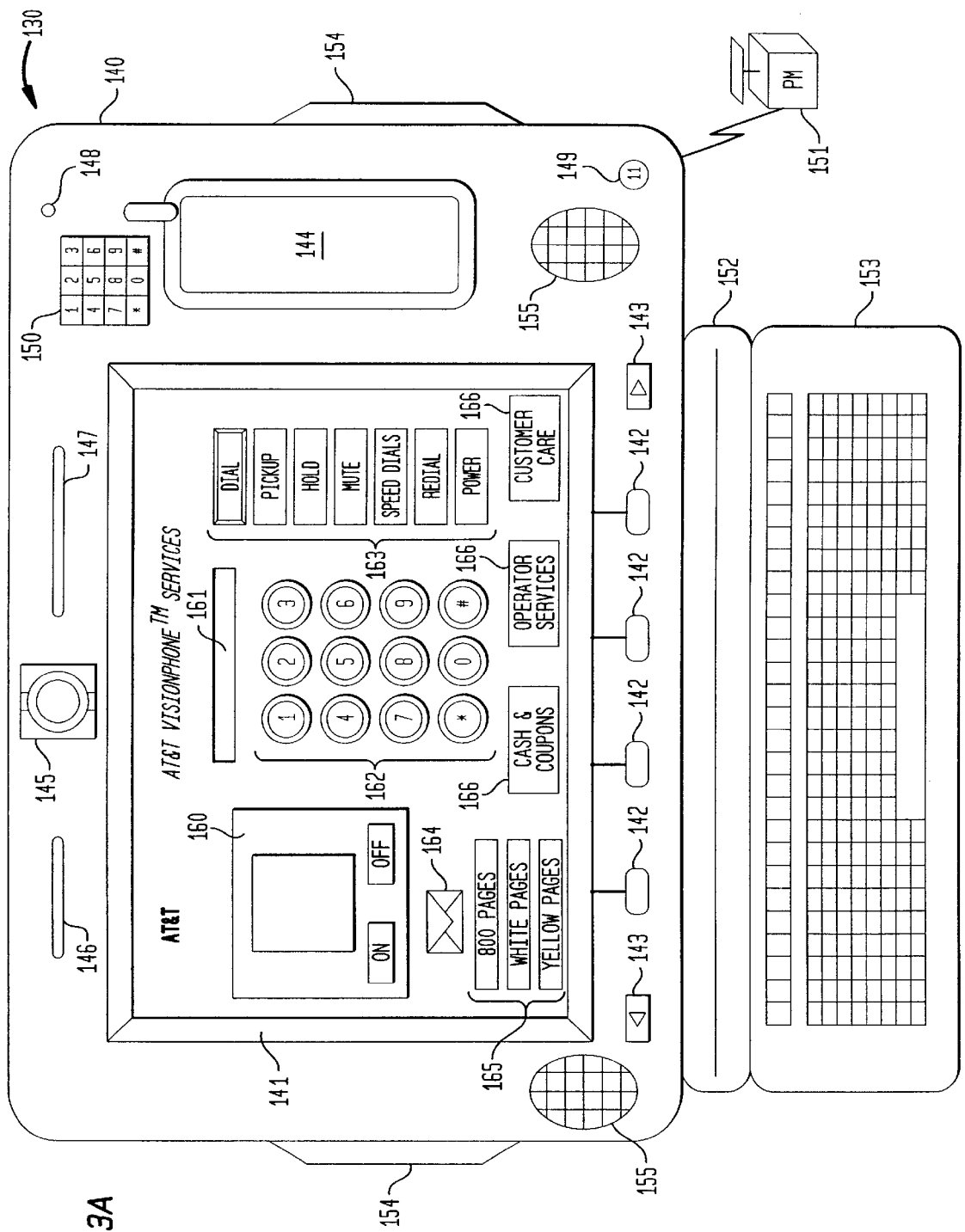
FIGS. 3A and 3B illustrate an embodiment of a video phone consistent with the architecture shown in FIG. 1.
Figure 3B:
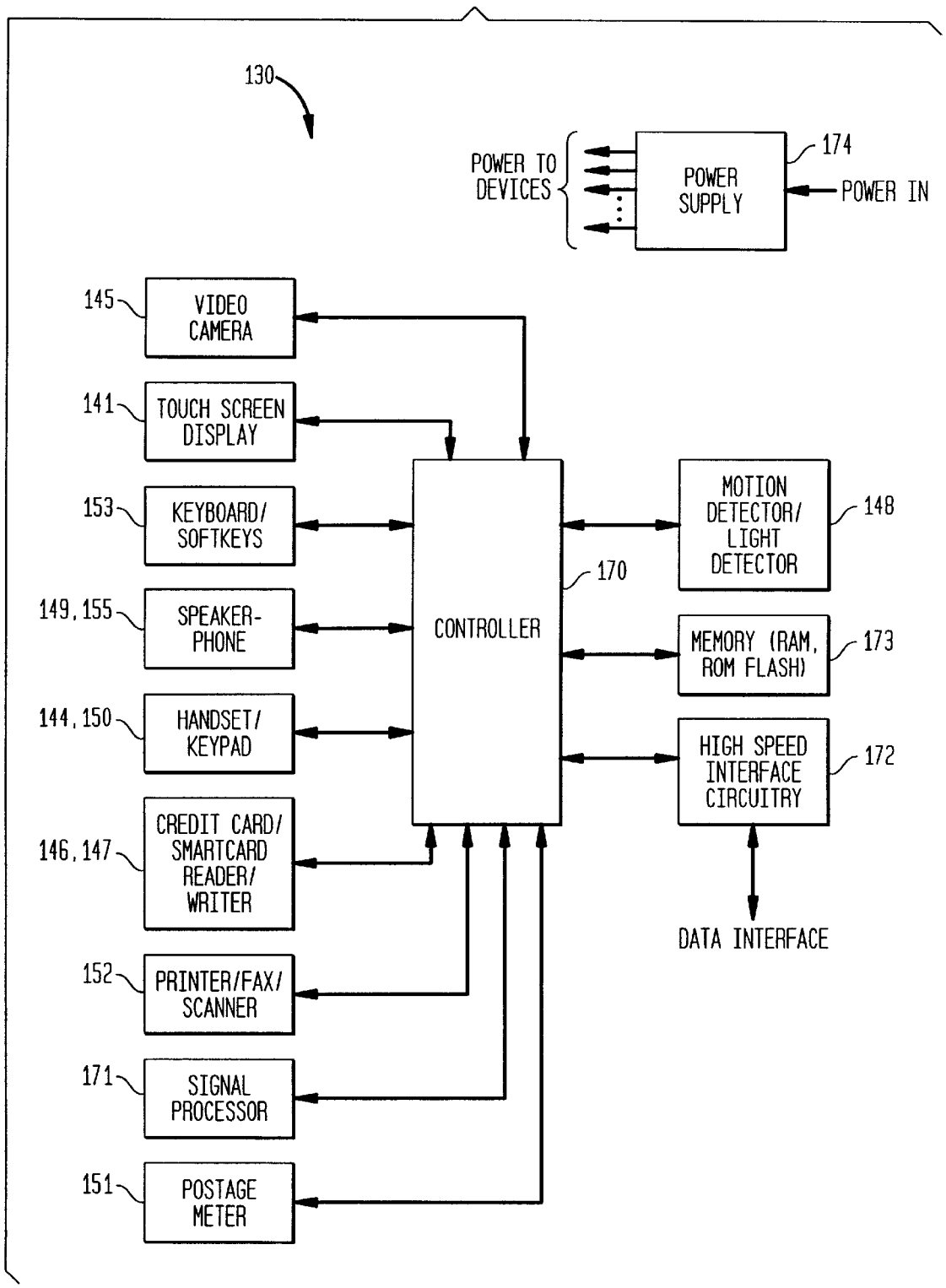

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170.

When the videophone 130 is used as a video telephone, the display 141 may include one or more video window(s) 160 for viewing a person to whom a user is speaking and/or showing the picture seen by the person on the other end of the video phone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
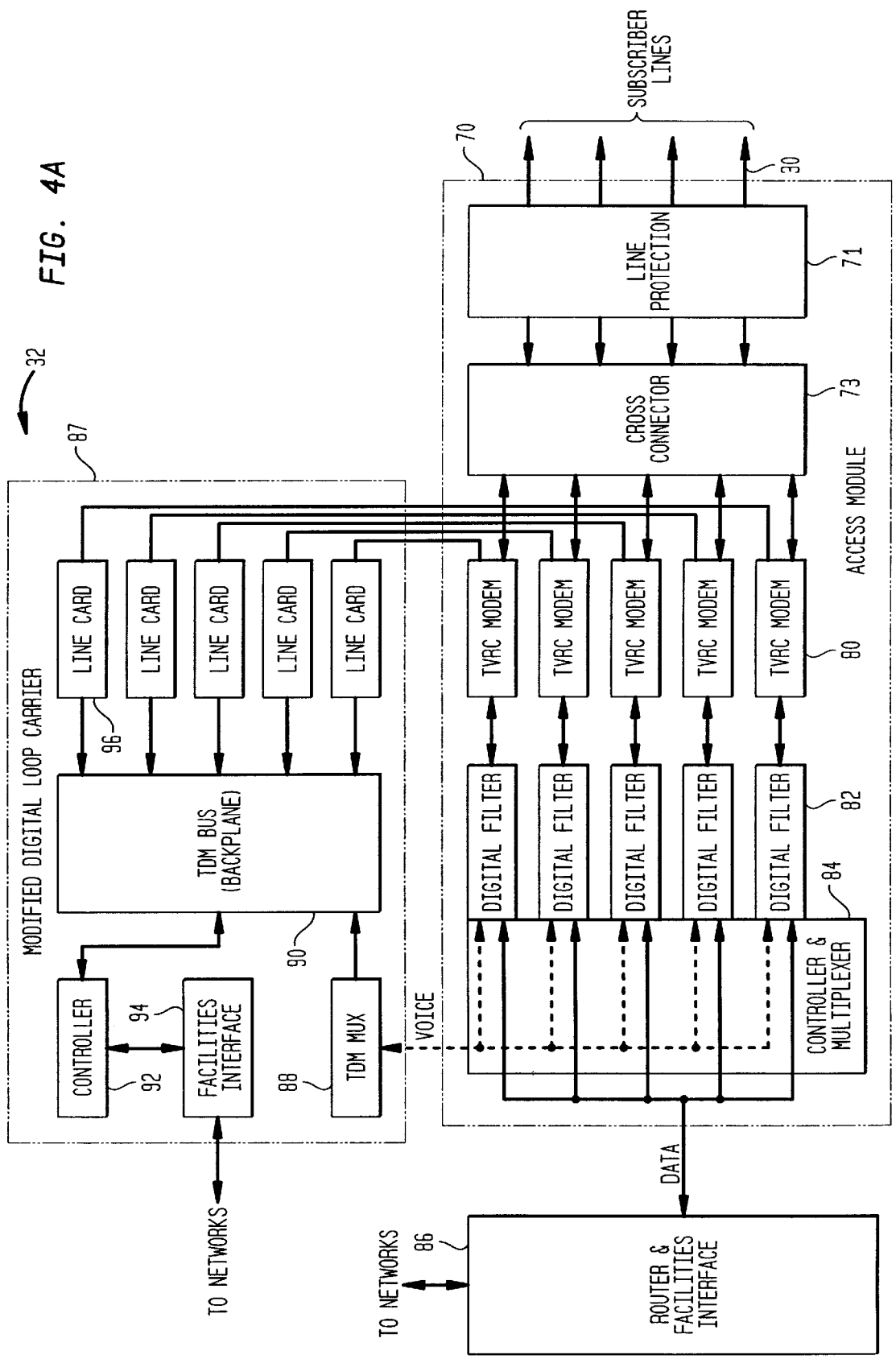
FIG. 4A is a block diagram of an embodiment of a facilities management platform consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments that for transport across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (TDM) multiplexor (MUX) 88, a TDM bus 90, a controller 92, and/or a facilities interface 94.

During normal operations, digital signals on the customer connection 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexor 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexor 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
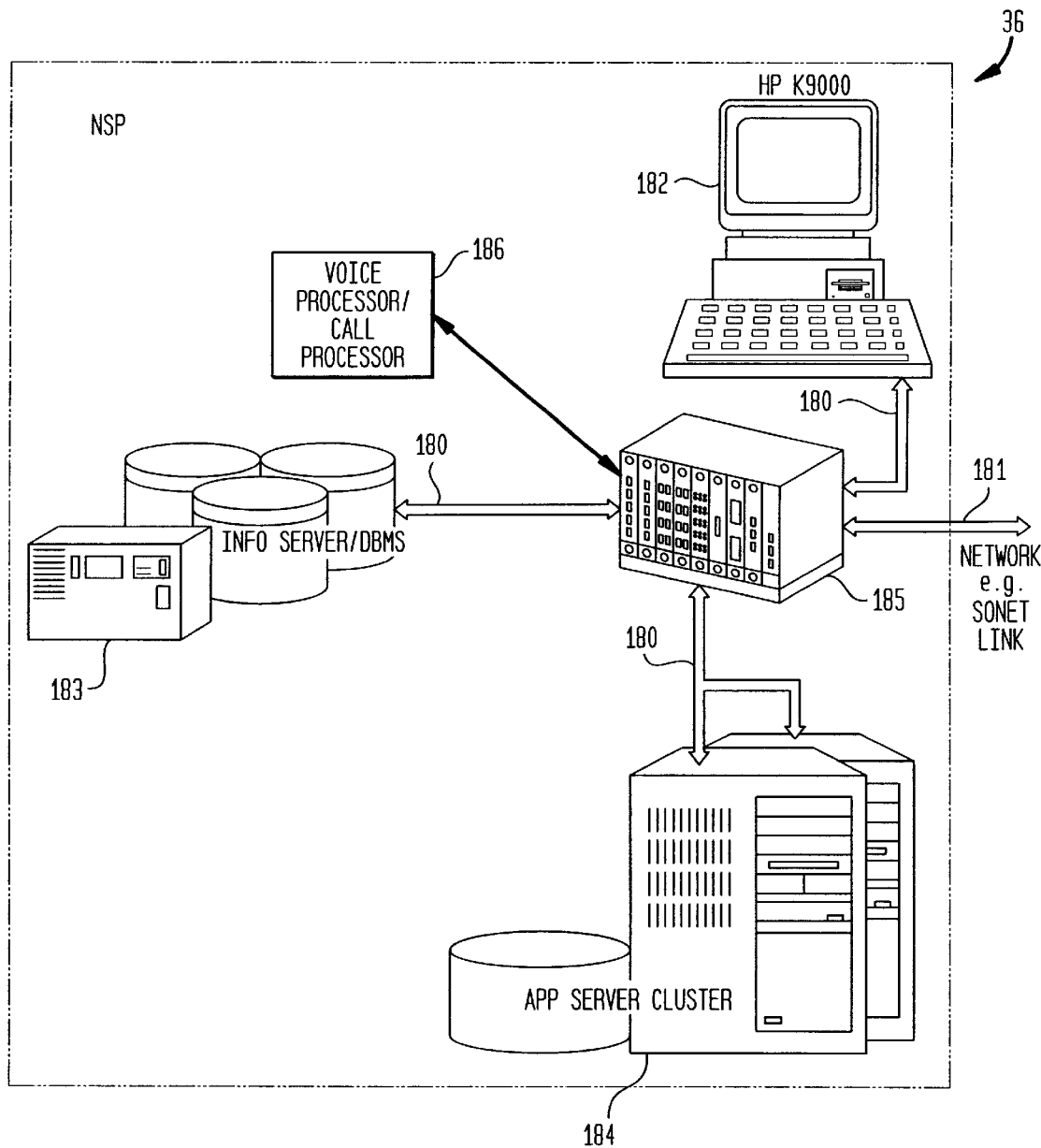
FIG. 4B illustrates a block diagram of an embodiment of a network server platform consistent with the architecture shown in FIG. 1.

Referring to FIG. 4B, the NSP 36 may be variously configured to provide any number of services provided by a server such as information services, Internet services, pay-per-view movie services, database services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMPs 32. The information/data base server 183 may perform storage and/or database functions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

Figure 5:
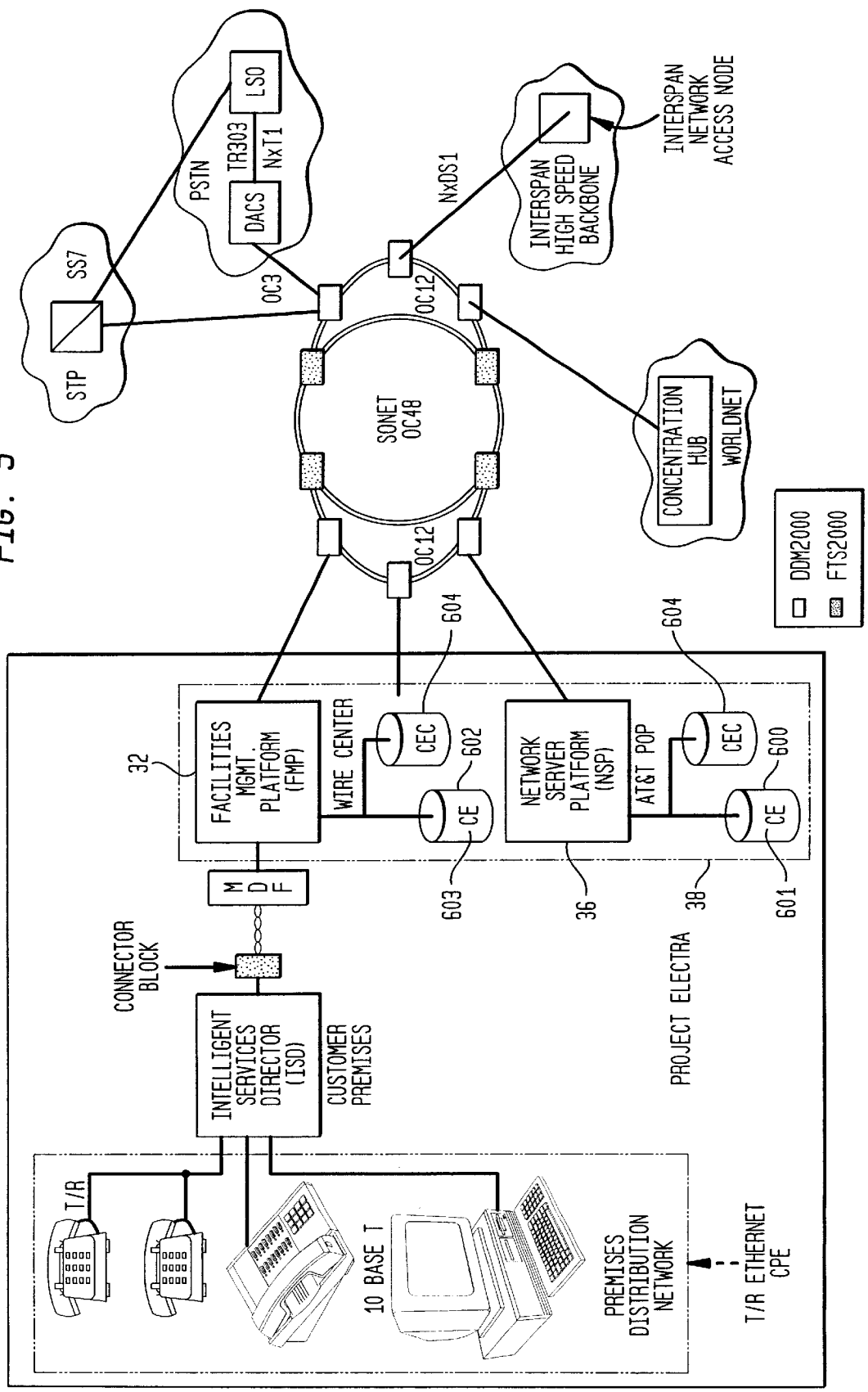
FIG. 5 illustrates the location of the NSP and FMP memory caches.

FIG. 5 illustrates the location of a memory cache at the NSP 36 and the FMP 32. The location of large caches of memory, sometimes referred to as cache farms 609, can reduce traffic on the network trunks or Internet backbone by providing frequently requested information at a point closer to the user. Usually, the location of memory caches of the FMP 32 is avoided due to space restrictions in the local office.

In operation, when a user first requests a particular URL address, the cache engine located on the NSP 36 intercepts the request, downloads the Web page located at the URL address and sends the content to the user while storing the contents in the NSP memory cache. The memory caches provide information for subsequent requests for the same content from the NSP memory cache 600 and automatically downloads the content. Information on the NSP memory cache 600 is periodically updated. For example, stock price data is not cached, but the banners and buttons on the stock quotation Web page are cached for a predetermined period. The result is much higher-performance Web access for the end user, with a significant reduction in network traffic.

The cache engine is transparent to users or the user's browsers. A router sends only Web traffic to the cache engine and the process is transparent to the browser except for improvements in Web page access times. Multiple cache engines can be employed providing linear scalability with the tasks divided between the cache engines. If a cache engine fails, the NSP cache controller 604 reassigns the traffic load among the remaining cache engines. When the failed cache engine is repaired and comes back on line, the NSP cache controller 604 reassigns traffic to the now functioning cache engine. If all the NSP cache engines fail, the router 185 sends user requests to the requested URL address and employs traditional methods for downloading providing a fail safe operation. In addition, the NSP cache engine 601 can provide and enforce Web site access policies through URL filtering techniques to ensure that users have access to only the subscribed authorization levels.

The NSP cache controller 604 defines the communication between NSP cache engines 601 and the router 185. The router 185 redirects Web requests to specific NSP cache engines 601 rather than to the intended URL address. The router cache engine controller 185 also determines NSP cache engine 601 availability and redirects requests to new NSP cache engines 601 as the NSP memory cache farm is expanded. The NSP cache engines 601 use high-performance file systems eliminating file fragmentation and long directory searches.

The NSP cache engine is designed to operate in a hierarchical environment, providing the benefits of caching at every level in the network.

The NSP and FMD memory cache engines 601 and 603 perform the following tasks:

1. A client requests Web content from a URL address.
2. The NSP router intercepts the request and routes it to the NSP cache engine.
3. If the NSP cache engine does not have the requested contents of the URL address, it sends the request to the actual URL address. If the content is located in the NSP memory cache, the content is downloaded to the user. If the content is not located in the NSP memory cache, the NSP cache engine downloads the content of the URL address and stores the content in the NSP memory cache.
4. Upon obtaining the contents of the URL address, the content is sent to the user.
5. While the contents of the URL address remain on the NSP memory cache, subsequent users seeking the content of the previously requested URL address are supplied the contents from the NSP memory cache.

The NSP cache controller continuously monitors and maintains balanced traffic loading among the NSP cache engines. Each NSP cache engine keeps track of the hit rate in each of their cache area responsibilities. The NSP cache controller 604 uses the access information to dynamically reallocate high traffic addresses from heavily used NSP cache engines to less heavily used NSP cache engines to distribute the traffic load. This maintains uniform, fast and efficient performance.

If an entire NSP memory cache fails, the router falls back to the traditional method of operation. The loss of the NSP memory cache 600 is transparent to users and does not affect service. Download times will probably increase, but otherwise no material or adverse affects will result. When operation of the NSP memory cache 600 is restored, the NSP cache engines 601 alert the router 185 of their availability using the NSP cache controller 604 and the router 185 resumes diverting Web requests to the NSP memory cache 600.

A requirement for any caching system is the ability to ensure that users see the identical content from the NSP or FMP memory caches as they would from the Internet. Content providers using HTTP 1.0 can control whether an object can be cached by setting a HTML flag attribute. If no attributes are set, then text documents stay in the cache for a variable time from 24 hours up to a week. HTTP 1.1 extends Version 1.0 capability to include an additional flag which can set an explicit expiration date and time of the cached object. These cache limitations can be overcome by having the NSP 36 or the FMP 32 periodically refresh content on a predetermined basis. Users can refresh content at any time by using the browser reload button associated with the user's browser.

Other frequently requested information by users include directory assistance, yellow pages advertising, community or specialized news information, movies on demand, billing and rate information. This information is also suitable for storing at the NSP memory cache 600.

In addition to user requested information, push information can be stored in these caches for fast downloading to the users. This information can include telephone directory information, advertisements, movies on demand, and billing information. Periodically, the cached data is refreshed if frequently accessed or deleted if infrequently requested.

Figure 6:
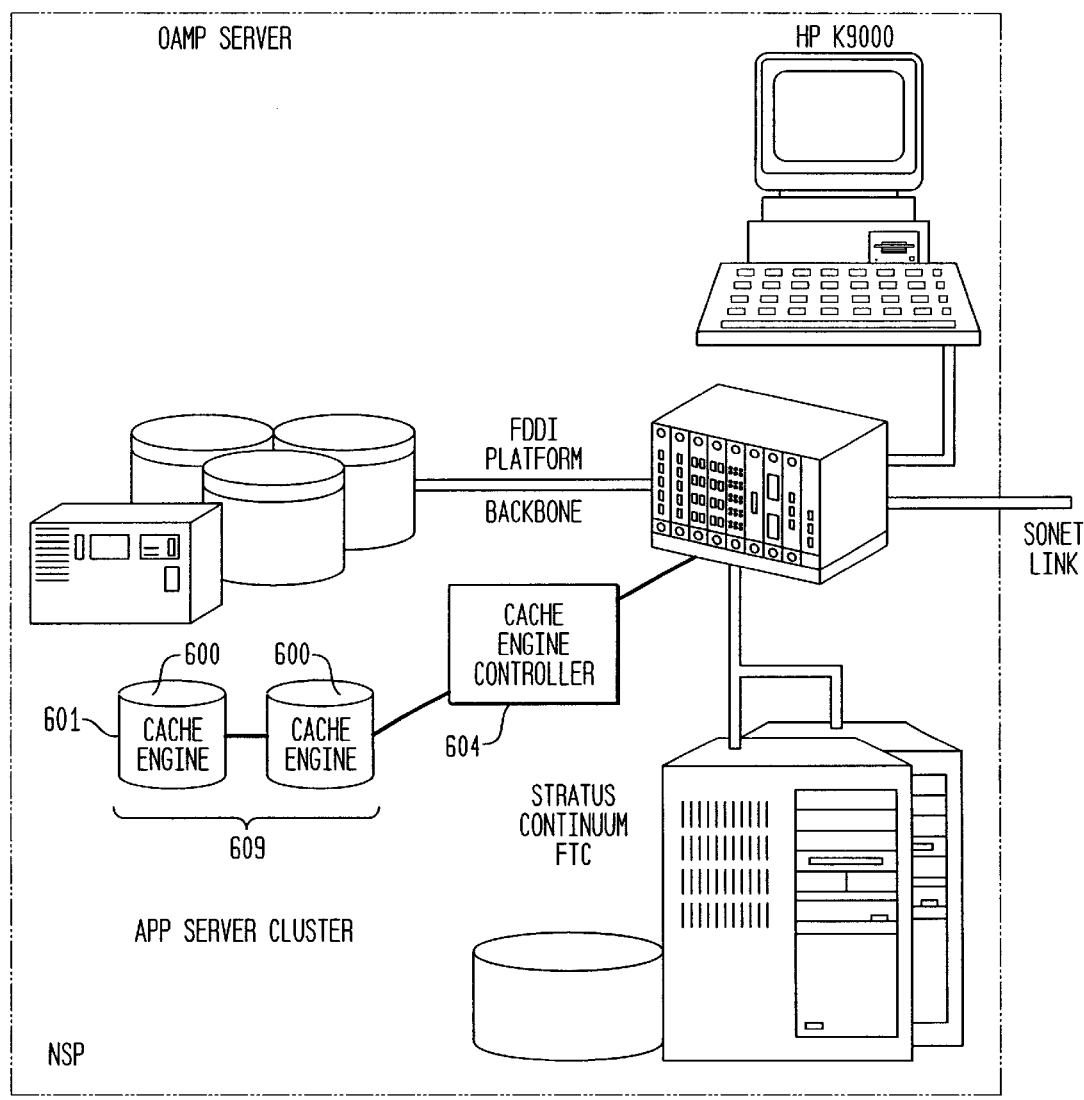
FIG. 6 illustrates the location of a memory cache, cache engine and cache engine controller.

FIG. 6 shows a cache engine controller 604 for controlling plural cache memories 600 shown as linked engines 601 for a cache system 609 operating off the NSP.

Push information is also suitable for storage in the NSP memory cache. Advertising banners and product information is downloaded to users on a frequent basis. Those advertisement seeking regional demographics are placed in the NSP memory cache 600 for that specific region.

FIG. 7 is a service process flow diagram for showing how the NSP 36 may comprise cache memory and maintain a user profile such that the NSP may obtain information from various information service providers for forwarding and display to a user in accordance with their user profile.

Any user may directly connect to an Internet service provider (ISP) with a high bandwidth (bit rate) connection without having to connect via a local exchange carrier (LEC). Components of the system and service architecture are shown at the top including personal computer, ISD 22, FMP 32 and NSP 36 connected to an Internet service provider, namely AT&T's WorldNet service.

As already described, bandwidth to the home or premises of a business may vary but may be in excess of 1 megabits per second according to bandwidth allocation procedures followed by the ISD 22 and FMP 32. Thus, there is a great advantage in a user having access to the Internet connectivity feature because the user has greater bandwidth availability and immediate access to AT&T WorldNet, for example, via NSP 36 bypassing the LEC.

Initially, the OAM&P server of the NSP 36 provisions the Internet connectivity service by signaling and provisioning the FMP 32 with address, routing and other data the FMP 32 needs. Step 1151 is directed to configuring the FMP 1105 serving the user of PC 1101 for Internet service routing to, for example, AT&T WorldNet Internet Service point of presence 1111. As a result, the FMP 32 updates its internal routing table of its memory with provisioned routing data for routing to the Internet service provider.

Now, it may be assumed that a user has turned on their personal computer and wants to establish an Internet session. As already described, one of the services that may be offered the user as a menu display option is Internet service connectivity. The user clicks on or otherwise inputs their selection of Internet service connectivity. The personal computer via the ISD 2 obtains immediate access to the already provisioned FMP 32 as the user's Internet session begins. The Internet protocol (IP) data packets are forwarded and returned via the FMP 32. The FMP 32 now acts as a mini-server. The FMP 32 looks up the user's packet header and compares the destination address against the routing table that was provisioned. The routing table then provides routing data for routing the IP packets to, for example, AT&T WorldNet Internet service at Wnet POP. The routing of IP packets to the Wnet POP and an exchange of packets follows via the FMP 32 to the personal computer. Note that the local exchange carrier is not involved and the bandwidth and data rate for exchange of Internet 1P packets may be the maximum bandwidth permissible by the facility between the FMP 32 and the personal computer. Similarly, the process of routing to other destinations in a routing table located at the FMP 32 that has been provisioned by NSP 36 is also possible. For example, besides serving as a gateway to the Internet, the NSP 36 may provide a gateway to applets from a JAVA based server for such things as bill paying, utility meter reading, energy management, security services for any connected device (for example, a device at a customer premises (other than a personal computer) such as the VisionPhone described earlier or other device.

Referring now to FIG. 7, there is shown an example of service connectivity by an NSP. In the application shown in FIG. 7, any user may enter and periodically update a user profile showing their interests and preferences. The NSP 1707 comprising significant cache memory can search for and obtain information directly related to the user entered preferences. When the user actuates their personal computer, the user may obtain the collected information that the NSP 1707 has collected on the user's behalf Components of the system and service architecture are shown at the top including personal computer (PC) or network computer (NC) or other terminal 1701, intelligent services director (ISD) 1703, facilities management platform (FMP) 1705 and network server platform (NSP) 1707. Info #1 1709 and Info #2 1711 are shown by way of example as one ore more information service providers that the NSP 1707 may access for information. Finally, by way of example, AT&T information content servers as a group are shown as AT&T Content Servers 1713.

At step 1751, the personal computer, intelligent terminal, video phone or other terminal 1701 performs system/service initialization. Without a user profile, the service will not be able to retrieve any relevant information. There is a startup via a user interface applet, for example, by clicking on a user profile icon. Then, the user is presented with a user profile display or other input means for inputting information contents of interest to the user. The contents ultimately may refer to channels whereby the information can be obtained, for example, stock market ticker or sports ticker channels. Likewise, the contents may simply define a preference such as to provide information directed to genealogical research of an ancestor or hobby or scientific interests or pursuits.

At step 1753, the user profile for selected contents (information channels) is transmitted via the ISD 1703 and FP 1705 for storage at the NSP 1707. The NSP 1707 then updates the user profile at step 1755 that is presently stored in memory or initializes the user profile in memory. The NSP 1707 then, once the use profile is known, can begin to search for relevant information at any and all information sources available on SONET ring network 42 (FIG. 1). The NSP 1707 then forwards an auto-start Info Receiver applet to the PC/NC 1701 for display, for example, as a menu selectable item or an icon or the like. Whenever the user accesses that applet, the collected information for their user profile is pushed to their terminal at step 1771.

However, prior to an information to terminal dump at step 1771, the NSP collects information from various sources at steps 1761, 1763 and 1765. The access to the information source may be via private line, shared line, Internet or telephony channels. For example, at step 1761 the information contents of Info #1 1709 relevant to the user profile is downloaded and stored in cache memory of NSP 1707 for that user to identify themselves and access. At step 1763, the information contents of Info #2 1711 relevant to the user profile is downloaded and stored in cache memory of NSP 1707 for the same user. Only two information sources are shown but many information sources may be queried and the query results downloaded to NSP 1707. Finally, via AT&T or other Internet service provider, the respective information content servers may be queried for relevant information and or channels (virtual or physical) realized and provided to NSP 1707. These may include stock market tickers, sports tickers, new tickers and the like of current interest. At either NSP 1707 or personal computer or network computer 1701, information filters may be used to only retrieve current data with respect to, for example, the stock portfolio or sports teams of interest to the user. Moreover, the NSP 1707 must periodically update the cache memory with newly received information relevant to the user's requests. A new information source may appear on the Internet or as a telephone listing or a new sports or other channel may be identified to NSP 1707 for polling. This is shown as step 1767.

In summary, then as shown at step 1769, the NSP 1707 caches contents from different sources (including from itself—for example—local directory listings and geographical location finding services). The NSP also polls contents from various sources to, for example, obtain updates or new information. At a user specified time interval or according to a user specified schedule as per their user profile, and according to a user specified priority ranking, the information may be ordered and delivered to the user via an information push at step 1771.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A network caching system, comprising:
  a plurality of memory caches connectable to a computer network;
  a plurality of cache engines connected to said plurality of memory caches and further connectable to said computer network, each said cache engine being configured to receive a request from a user for data stored on a remote source connected to said computer network;
  wherein each said cache engine is configured to retrieve said data from at least one of said memory caches and transmit said data to said user when said data is stored in one of said memory caches;
  whereas each said cache engine is configured to transmit a request for said data to said remote source, receive said data from said remote source, store said data in a memory cache, and transmit said data to said user, when said data is not already stored in one of said memory caches;
  a cache engine controller connected to said plurality of cache engines, said cache engine controller being configured to manage said plurality of cache engines to provide balanced load access to said plurality of cache engines.

2. The system of claim 1, where said cache engines are each configured to enforce user access restrictions imposed by said remote source.

3. The system of claim 1, where said cache engines are each configured to retrieve, at the occurrence of a predefined event, a current version of data that is already stored in a respective said memory cache and store said current version of data in said respective memory cache.

4. The system of claim 3, where said predefined event is the lapse of a predefined period of time.

5. The system of claim 3, where said predefined event is the issuance of a user request to update the content of said respective memory cache.

6. The system of claim 1, where said cache engine controller is configured to reallocate traffic loading among said cache engines, whereby responsibilities of a heavily loaded cache engine are reallocated to a relatively less heavily loaded cache engine.

7. The system of claim 6, where said cache engine controller is configured to reallocate a traffic load of a failed said cache engine to remaining ones of said cache engines.

8. The system of claim 1, where said cache engine controller is configured to maintain a user profile for said user, search said computer network for information relevant to said user profile, and store said relevant information in one or more of said memory caches.

9. The method of claim 1, where said memory caches are located within a network server platform.

10. The method of claim 1, where said memory caches are located within a facilities management platform.

11. In a network caching system including a plurality of memory caches connectable to a computer network and a plurality of cache engines connected to said plurality of memory caches and further connectable to said computer network, a method comprising:
  receiving a request at each said cache engine from a user for data stored on a remote source connected to said computer network;
  retrieving said data from at least one memory cache;
  transmitting said data from each said cache engine to said user when said data is stored in one of said memory caches;
  when said data is not already stored in one of said of memory caches,
    transmitting a request for said data from each said cache engine to said remote source,
    receiving said data from said remote source,
    storing said data in a memory cache, and
    transmitting said data from each said cache engine to said user; and
  managing said plurality of cache engines to provide balanced load access to said plurality of cache engines.

12. The method of claim 11, further comprising enforcing user access restrictions imposed by said remote source.

13. The method of claim 11, further comprising retrieving, at the occurrence of a predefined event, a current version of data that is already stored in a respective said memory cache and storing said current version of data in said respective memory cache.

14. The method of claim 11, wherein said managing includes reallocating traffic loading among said cache engines, wherein responsibilities of a heavily loaded cache engine are reallocated to a relatively less heavily loaded cache engine.

15. The method of claim 11, wherein said managing includes reallocating a traffic load of a failed said cache engine among remaining ones of said cache engines.

* * * * *